(12) United States Patent
Smith, Jr. et al.

(10) Patent No.: US 6,603,461 B2
(45) Date of Patent: *Aug. 5, 2003

(54) KEYBOARD AS A COMPUTER POINTING DEVICE FOR DISABLED USERS

(75) Inventors: Newton James Smith, Jr., Austin, TX (US); James Patrick Bowman, Austin, TX (US); Herman Rodriguez, Austin, TX (US)

(73) Assignee: International Business Machines Corp., Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/414,343

(22) Filed: Oct. 7, 1999

(65) Prior Publication Data

US 2002/0175898 A1 Nov. 28, 2002

(51) Int. Cl.[7] ............................. G09G 5/00; G09G 5/08
(52) U.S. Cl. ........................ 345/168; 345/156; 345/157; 345/163; 345/172
(58) Field of Search ..................... 341/20–27; 345/168, 345/156, 163, 164, 184, 157, 172

(56) References Cited

U.S. PATENT DOCUMENTS

| | | | |
|---|---|---|---|
| 4,369,439 A | 1/1983 | Broos | |
| 4,917,516 A | 4/1990 | Retter | |
| 5,198,802 A | 3/1993 | Bertram et al. | |
| 5,457,480 A | 10/1995 | White | |
| D373,999 S | 9/1996 | Staats | |
| 5,563,631 A | 10/1996 | Masunaga | |
| 5,621,436 A | 4/1997 | Solhjell | |
| 5,847,695 A | * 12/1998 | Duncan et al. | 345/163 |
| 5,900,864 A | * 5/1999 | Macdonald | 345/168 |
| 5,936,555 A | * 8/1999 | Zagnoev | 341/22 |
| 6,018,334 A | * 1/2000 | Eckerberg et al. | 345/163 |
| 6,107,996 A | * 8/2000 | Franz et al. | 345/172 |

* cited by examiner

Primary Examiner—Bipin Shalwala
Assistant Examiner—David L. Lewis
(74) Attorney, Agent, or Firm—Kevin L. Daffer; Conley Rose P.C.; Marilyn S. Dawkins (57) ABSTRACT

A keyboard that may be utilized as a pointing device for disabled users is presented. The keyboard has one or more large buttons that allows the keyboard to be toggled between two different states. The first state corresponds to using the keyboard as a pointing device. A movement sensor is activated that may detect movement of the keyboard. The detected movement of the keyboard is then used by a computer system to control the movement of a cursor about a display screen. Additionally, one or more keys on the keyboard are grouped together to form compound keys that correspond to the pointing device buttons. The second state of the keyboard corresponds to that of standard keyboard operation in which a user may utilize the keyboard to type in letters, numbers, and commands in the typical fashion.

27 Claims, 4 Drawing Sheets

KEYBOARD AS A COMPUTER POINTING DEVICE FOR DISABLED USERS

BACKGROUND OF THE INVENTION

1. Field of the Invention

This invention relates to computer input devices and, more particularly, a keyboard that may be utilized as a computer pointing device for disabled users.

2. Description of the Relevant Art

Modern computer systems often implement graphical user interfaces ("GUIs") because it makes the interface with the computer system much more intuitive for the computer user. Computer systems implementing GUIs typically include a keyboard and a pointing device as input devices for the user. Keyboards typically allow the user to type in letters, numbers, and commands. Pointing devices typically allow the user to move a cursor about a display screen and to select objects. A commonly used pointing device is the computer mouse. Movement of the mouse about a flat surface typically located on a desktop causes movement of the cursor about the display screen. Selection of objects is accomplished by simultaneously holding the position of the cursor on top of the object while clicking, clicking and holding, or double clicking one or more buttons located on the mouse. A mouse typically has anywhere from one to three buttons and most commonly has two buttons. Use of a mouse generally requires that the user have good manual motor control. A variety of other pointing devices, such as the TrackPoint™ (manufactured by the IBM Corporation of Armonk, N.Y.), track ball, touch pads, and touch screen overlays, have been developed as alternatives to the mouse but these devices also generally require good manual motor control.

A variety of conditions, such as cerebral palsy, Parkinson's disease, multiple sclerosis, or arthritis, can interfere with the manual motor control needed to use a mouse, to move a cursor to a specific location on a display screen, and/or to select objects by operation of a mouse button. For example, to move an object about a display screen requires positioning the cursor on top of the object by moving the mouse, clicking a mouse button and holding the mouse button down, moving the object to the new location by moving the mouse, and releasing the mouse button. Using a pointing device, such as a mouse, to operate a GUI can therefore be extremely difficult for disabled users who have impaired motor control.

Many operating systems provide an alternative to using a pointing device. For example, certain objects may be selected by a key or combination of keys located on a keyboard. While such use of a keyboard partially eliminates the need for use of a mouse, users who experience difficulty manipulating a mouse may experience similar difficulty depressing the correct key or combination of keys on a keyboard. Additionally, use of the keyboard degrades the intuitive nature of a GUI.

It is therefore desirable to provide a computer pointing device that requires much less manual motor control than a mouse or other existing pointing devices. It is also desired that the buttons that need be operated in conjunction with the pointing device also be easier to use. Further, it is desired that simultaneous operation of the pointing device and buttons require much less manual motor control.

SUMMARY OF THE INVENTION

The problems outlined above are in large part addressed by utilizing a keyboard as a pointing device. Such a keyboard would have one or more large buttons that would allow the keyboard to be toggled between two different states. A first state corresponds to using the keyboard as a pointing device. A movement sensor is activated that may detect movement of the keyboard. The detected movement of the keyboard is then used to control the movement of a cursor about a display screen. Additionally, keys on the keyboard may be grouped together to form compound keys that correspond to the pointer buttons. For example, all keys on the left-hand side of the keyboard may correspond to the left mouse button while all keys on the right-hand side of the keyboard may correspond to the right mouse button. A second state of the keyboard corresponds to that of standard keyboard operation in which a user may utilize the keyboard to type in letters, numbers, and commands in the typical fashion.

Utilization of a keyboard as a pointing device may advantageously require much less manual control than a mouse or other existing pointing devices. Since a keyboard is much larger than a mouse, movement of the keyboard may be accomplished using both hands. Additionally, grouping of multiple keys on the keyboard to form compound keys corresponding to the mouse buttons or other pointing device buttons may simplify the actions of clicking, clicking and holding, and double clicking. For example, a compound key corresponding to a left-hand button on a pointing device may occupy the entire left-hand side of the keyboard thereby effectively providing a very large target. Additionally, one hand may be used to hold the keyboard steady, and thereby hold the cursor position steady, while the other hand may be used to activate the appropriate compound key. Utilization of the keyboard as a pointing device is therefore believed to require much less precise manual control. This may be particularly advantageous for disabled users and provide those users with a more intuitive input device for GUIs.

A keyboard that may be used as a pointing device is contemplated. The layout of keys on the keyboard may be a typical layout such as the "QWERTY" keyboard. The key layout may also be the popular expanded keyboard key layout, where the keyboard includes function keys and a number keypad in addition to the "QWERTY" layout. The keys may also be oversized to further accommodate the needs of a disabled user. The actual layout of the keys is not of critical importance, but rather the presence of some set of keys to allow a user to input letters, numbers, and commands is all that is needed. The keyboard may also include one or more large buttons to allow the state of the keyboard to be toggled. In the first state, the keyboard is utilized as a pointing device and slight movement of the keyboard about a desktop relative to a fixed point on the desktop is allowed. A movement sensor coupled to the keyboard is used to sense any movement of the keyboard. In the second state, the keyboard is utilized as a standard keyboard and is prevented from moving about the desktop.

In one embodiment, the movement sensor comprises a control stick extending below the keyboard. The control stick is coupled to a movement transducer located within a lower portion of the keyboard. Additionally, the keyboard has two sets of legs attached to a lower surface of the keyboard. When the keyboard is in the first state, the control stick and the first set of legs are in contact with an upper surface of a desktop on which the keyboard is placed. The first set of legs are adapted to move freely about the desktop while the control stick is adapted to remain fixed in place on the desktop. Movement of the keyboard then results in deflection of the control stick that is sensed by the movement transducer. When the keyboard is in the second state, the second set of legs are in contact with the desktop. The second legs are adapted to remain fixed in place on the desktop thereby preventing movement of the keyboard.

In addition to the keyboard described above, a system is also contemplated herein. The system includes a computer system, a keyboard, as described above, coupled to the computer system, a display screen coupled to the computer system, and a program adapted for execution on the computer system. When the keyboard is in the first state, the program processes movement data from the movement transducer. The program uses this information to control the position of a cursor on the display screen. Also while the keyboard is in the first state, the program groups one or more keys on the keyboard into at least one compound key that corresponds to a specific command. For example, all the keys on the left-hand side of the keyboard may be grouped into a compound key that corresponds to a left point device button. Actuation of any key corresponding to this compound key results in the computer system performing an operation identical to that operation performed after actuation of the left-hand button on the pointing device. When the keyboard is in the second state, the program processes data from the keyboard that results from user actuation of the keys as normal keyboard data (i.e., the program interprets the data as letters, numbers, and commands). The program is preferably present in the system memory of the computer system as a keyboard device driver and/or a pointing device driver. By having the program present as a device driver, the utilization of the keyboard as a pointing device will be transparent to various application programs, such as, for example, a word processor or spreadsheet, that a user may wish to run on the computer system.

A computer-readable storage medium is also contemplated herein. The storage medium contains program instructions that can be implemented by a processing unit to receive data from a keyboard, which may be utilized as a pointing device as described above. When the keyboard is in a first state, the program instruction may be implemented to process movement data from the keyboard and to control the position of a cursor on a display screen. Also while in the first state, the program instructions may be implemented to process key actuation data from the keyboard and to group one or more keys into a specific command such as a pointing device button operation. When the keyboard is in a second state, the program instructions may be implemented to process key actuation data as normal keyboard data corresponding to letters, numbers, and commands.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
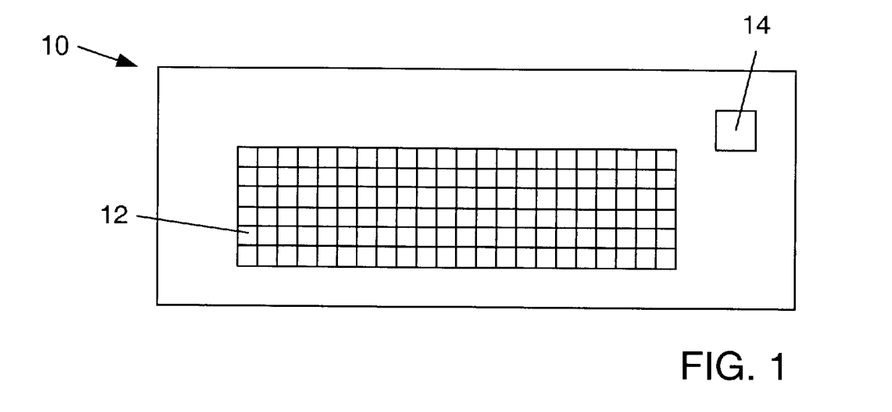
FIG. 1 is a top-view schematic of an exemplary keyboard that may be used as a pointing device.
Figure 2:
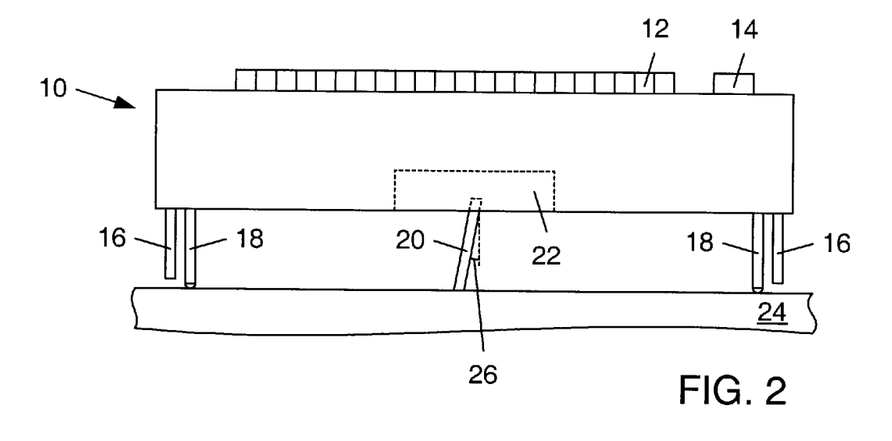
FIG. 2 is a side-view schematic of the keyboard of FIG. 1 in which the keyboard is configured for use as a pointing device.
Figure 3:
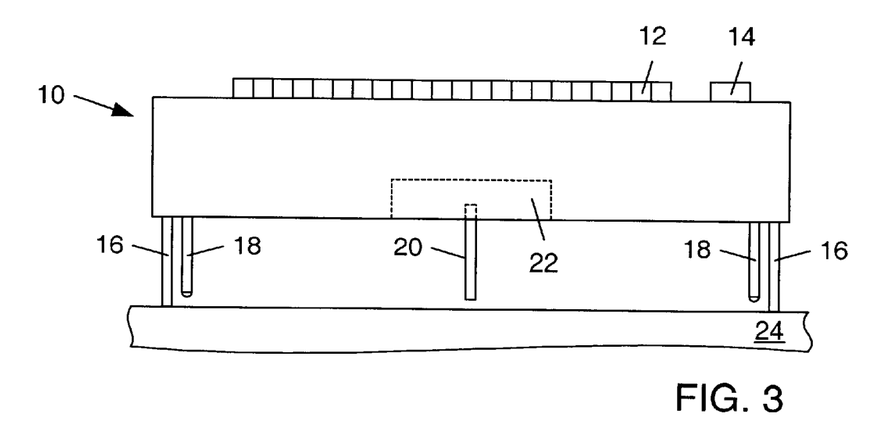
FIG. 3 is a side-view schematic of the keyboard of FIG. 1 in which the keyboard is configured for use as a normal keyboard.

Turning now to the drawings, FIGS. 1–3 show an exemplary keyboard that may be used as a pointing device. FIG. 1 depicts a top-view schematic of keyboard 10. Keys 12 may be utilized by a user to input letters, numbers, and commands. Keys 12 may be arranged in any layout such as, for example, a "QWERTY" layout. Keyboard 10 also includes one or more large buttons 14 that may be used to change the state of keyboard 10. Button 14 may be located anywhere on keyboard 14 but is preferably located along a periphery of an upper surface of keyboard 10. Actuation of button 14 causes keyboard 10 to toggle between two different states. Keyboard 10 functions as a pointing device in the first state and functions as a normal keyboard in the second state.

FIGS. 2 and 3 depict side-view schematics of keyboard 10. FIG. 2 depicts keyboard 10 in the first state, corresponding to use as a pointing device, while FIG. 3 illustrates keyboard 10 in the second state, corresponding to use as a normal keyboard. In FIG. 2, keyboard 10 is located on an upper surface of desktop 24. Alternatively, keyboard 10 may be placed on any relatively flat surface. Keyboard 10 has two sets of legs, legs 16 and legs 18. Legs 16 and 18 are attached to a lower surface of keyboard 10. Legs 16 and 18 are preferably located near the four corners of keyboard 10 but may positioned elsewhere. While keyboard 10 is being used as a pointing device legs 18 are in contact with desktop 24 and legs 16 are not. Legs 18 are adapted to allow keyboard 10 to move freely about desktop 24. For instance, legs 18 may contain ball rollers at the lower end of legs 18 that allow legs 18 to roll freely on the surface of desktop 24.

Additionally, control stick 20 is also in contact with desktop 24. Control stick 20 is adapted such that it will remain positioned at the same place on desktop 24. For instance, control stick 20 may have soft rubber covering a lower portion of control stick 20 so that control stick 20 will have a high-friction contact with desktop 24. An upper portion of control stick 20 is coupled to movement transducer 22 located in a lower portion of keyboard 10. Control stick 20 and movement transducer 22 together comprise a movement sensor for keyboard 10. Movement transducer 22 is adapted to sense any deflection of control stick 20. For example, in FIG. 2, keyboard 10 has been moved to the right resulting in deflection 26 of control stick 20 from the vertical. Such a movement of keyboard 10 may be caused by a user pushing on keyboard 10. Movement transducer 22 can measure the amount of deflection 26 of control stick 20 and communicate that information to a computer system to which keyboard 10 is coupled. In one embodiment, movement transducer 22 may be a thick film strain gauge as used in the TrackPoint™ pointing device manufactured by the IBM Corporation of Armonk, N.Y. Additionally, while keyboard 10 is in the first state and acting as a pointing device, keys 12 may be used to mimic the functions of pointer buttons as will be described in greater detail with reference to FIGS. 4 and 5.

In FIG. 3, in which keyboard 10 is in the second state and is configured to operate as a normal keyboard, legs 18 and control stick 20 are no longer in contact with desktop 24. Instead legs 16 are in contact with desktop 24. Legs 16 are adapted so that keyboard 10 will remain stationary on desktop 24. In this configuration, keys 12 may be used by an operator in the normal fashion to input numbers, letters, and commands. In an alternative embodiment, control stick 20 may also remain in contact with desktop 24.

Actuation of button 14, which causes keyboard 10 to toggle between its two states, causes either legs 16 or legs 18 and control stick 20 to be in contact with desktop 24. Either legs 16, legs 18, and/or control stick 20 are caused to be moved up and down. Preferably, only legs 16 are caused to be moved. The motion may be controlled by either purely mechanical linkages between button 14 and legs 16 or may be accomplished electrically through the use of one or more motors. Alternatively, button 14 may be replaced or supplemented by a lever located on the side of keyboard 10. Movement of lever 10 may result in movement of legs 16 thereby bringing legs 16 into contact with desktop 24 or removing legs 16 from contact with desktop 24. Additionally, instead of keyboard 10 resting directly on desktop 24, keyboard 10 may be mounted to a fixed frame and operation of button 14 may allow movement of keyboard 10 relative to the fixed frame.

Figure 4:
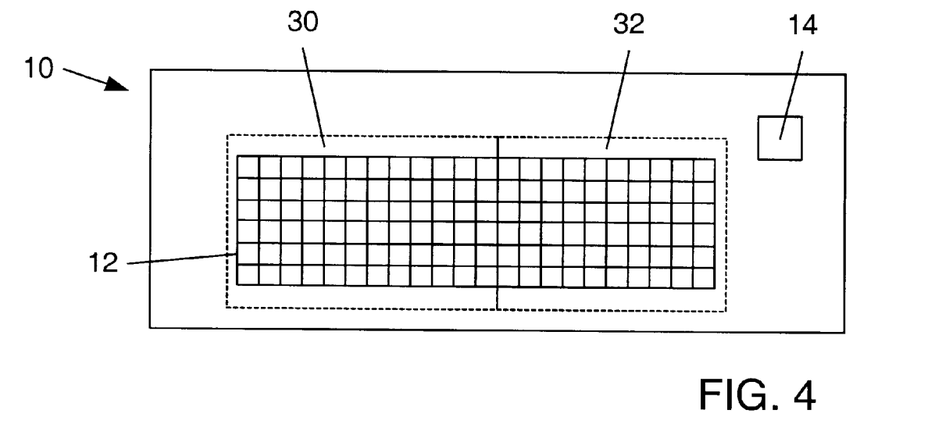
FIG. 4 is a top-view schematic of the keyboard of FIG. 1, configured to operate as a pointing device, showing a grouping of keys into compound keys to mimic operation of pointing device buttons.
Figure 5:
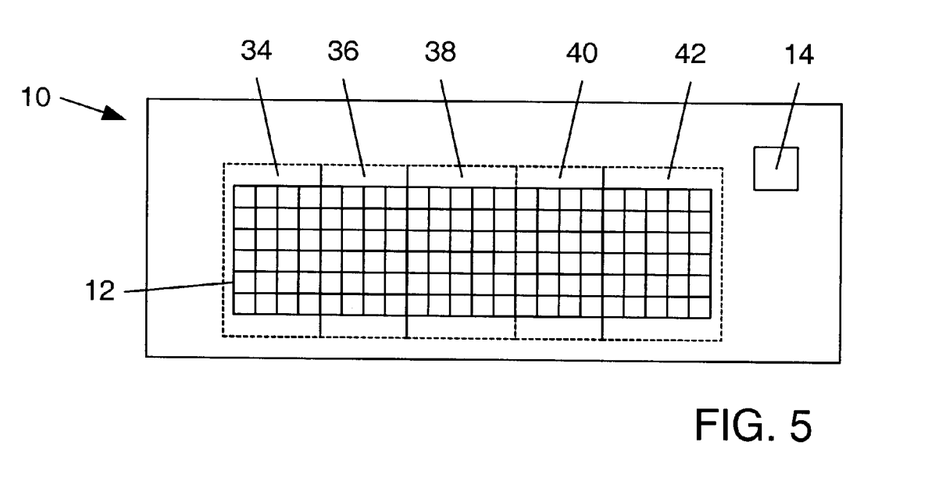
FIG. 5 is a top-view schematic of the keyboard of FIG. 1, configured to operate as a pointing device, showing an alternative grouping of keys into compound keys to mimic operation of pointing device buttons.

FIGS. 4 and 5 show a top-view schematic of keyboard 10 in the first state in which keyboard 10 is configured to operate as a pointing device. Actuation of keys 12 may be used to mimic the actuation of pointing device buttons such as are found on a mouse or track ball. A mouse (and most other pointing devices) typically contains one to three buttons and most often has two buttons. These buttons typically may be clicked either once, twice, or clicked and held to select objects on a display screen. One or more of keys 12 may be grouped together to form compound keys that then act as pointing device buttons thereby providing effectively large keys that are easier for disabled users to actuate.

FIG. 4 depicts one way for grouping keys 12 on keyboard 10 to form compound keys. The actual grouping of keys 12 is preferably selected by a user of keyboard 10. All keys 12 on the left-hand side of keyboard 10 are grouped together to form compound key 30 while all keys 12 on the right-hand side of keyboard are grouped together to form compound key 32. Compound key 30 may then be assigned to effectively be the left-hand pointing device button while compound key 32 may then be assigned to effectively be the right-hand pointing device button. Actuation of any key 12 assigned to compound key 30 is then interpreted by the computer system coupled to keyboard 10 as if a left-hand pointing device button was actuated.

FIG. 5 illustrates an alternative method for grouping keys 12 to form compound keys. Keys 12 have been grouped together into five different compound keys 34, 36, 38, 40, and 42. Actuation of compound key 34, which means actuation of any key 12 assigned to compound key 34, may be interpreted to be a single click of the left-hand button on the pointing device. Actuation of compound key 36 may be interpreted to be a click and hold of the left-hand button on the pointing device. A second actuation of compound key 36 may be interpreted to be a release of the left-hand button on the pointing device. Actuation of compound key 38 may be interpreted to be a double click of the left-hand button on the pointing device. Actuation of compound key 40 may be interpreted to be a single click of the right-hand button on the pointing device. Actuation of compound key 42 may be interpreted to be a click and hold of the right-hand button on the pointing device. A second actuation of compound key 42 may be interpreted to be a release of the right-hand button on the pointing device.

FIGS. 4 and 5 are to be taken merely as illustrative of ways in which keys 12 could be grouped to form compound keys that mimic operation of pointing device buttons. Keys 12 could be grouped in alternative ways. Assignment of the grouping of keys 12 into compound keys is preferably done by a user of the keyboard so that the groupings are such that it provides the user with a layout best suited to his or her needs.

Figure 6:
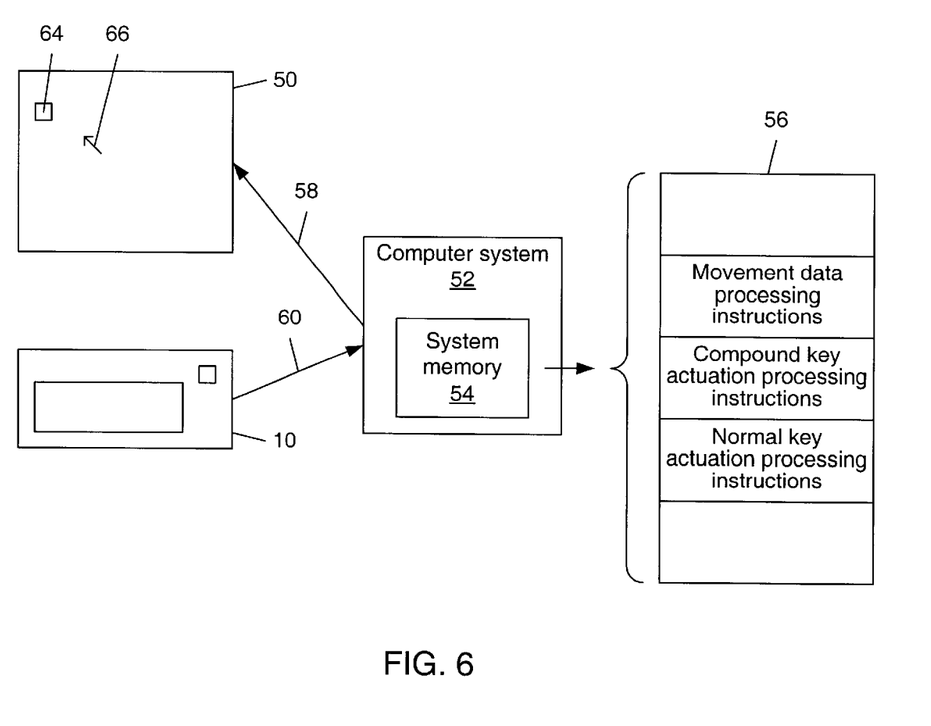
FIG. 6 is an exemplary block diagram of the interconnection of a keyboard, which may be used as a pointing device, a display screen, and a computer system.

FIG. 6 illustrates an exemplary block diagram for the interconnection of a keyboard that may be used as a pointing device, a display screen, and a computer system. Keyboard 10, which may be used as a pointing device, is connected to computer system 52 by bus 60. Display screen 50, which may be, for example, a computer monitor or flat panel display, is connected to computer system 52 by bus 58. Additionally, computer system 52 includes system memory 54. System memory 54 is either a volatile or non-volatile storage medium which may include a hard disk, a floppy disk, a read-only memory, and/or a random-access memory in which data and instructions are stored. A portion of the information stored in system memory 54 is shown in memory address space 56. The information in memory address space 56 includes instructions for processing of movement data and compound and normal key actuation data from keyboard 10.

Keyboard 10 can send information to computer system 52 such that computer system 52 knows the state of keyboard 10. While keyboard 10 is in the first state, which corresponds to the keyboard acting as a pointing device, computer system 52 can receive movement data from the movement transducer located within keyboard 10. Movement data processing instructions within memory address space 56 can then be used by computer system 52 to interpret the movement data and to change the position of cursor 66 on display screen 50.

Also while keyboard 10 is in the first state, computer system 52 can receive key actuation data from keyboard 10. Compound key actuation processing instructions within memory address space 56 can then be used by computer system 52 to assign the key actuated to the appropriate compound key. Computer system 52 may then perform the operation of the pointing device button assigned to that compound key. For example, if cursor 66 is positioned over object 64 on display screen 50 and the key actuated corresponds to a compound key associated with a left-hand button on the pointing device, the instructions may cause object 64 to be selected. Compound key actuation processing instructions may also include de-bounce logic in which any successive key actuation that occurs within an adjustable time interval after an initial key actuation is disregarded.

While keyboard 10 is in the second state, which corresponds to keyboard 10 acting as a normal keyboard, computer system 52 can receive key actuation data from keyboard 10. Normal key actuation processing instructions within memory address space 56 can be used by computer system 52 to interpret the key actuation as letters, numbers, or commands in the usual manner. For example, if a word processing program is being executed, key actuation may result in letters and numbers corresponding to the words being typed on the keyboard to appear on display screen 50.

The instructions for processing movement and key actuation data are preferably incorporated into a keyboard and/or a pointing device driver. If the instructions for processing data from a keyboard, which may be used as a pointing device, are incorporated as a device driver, the application programs running on the computer system will require no modification to be used with the new keyboard. Additionally, any such driver for the new keyboard preferably allows a user to adjust the assignment of keys to compound keys. In this way, the user may select a keyboard layout best suited to the user's needs. For example, if a user has use of only his or her left hand, keys may be assigned to compound keys that are best adapted for use by only a left hand.

Figure 7:
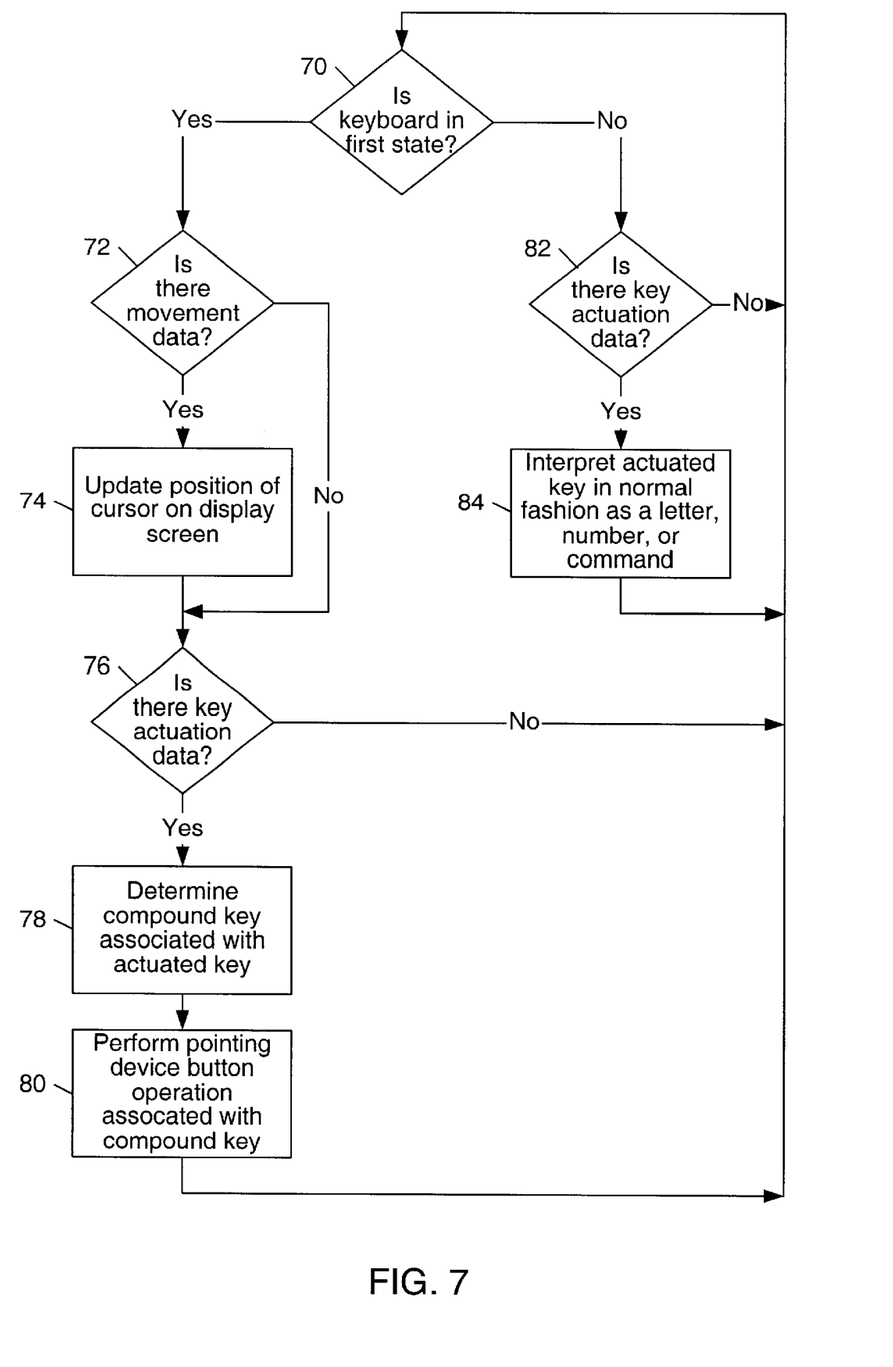
FIG. 7 is an exemplary flow diagram for the interpretation of data from a keyboard that may be used as a pointing device.

FIG. 7 is an exemplary flow diagram for the interpretation of data from a keyboard, which may be used as a pointing device, by a computer system coupled to the keyboard. Initially, the state of the keyboard is determined (box 70). If the keyboard is in the first state, corresponding to the keyboard acting as a pointing device, the presence of any movement data is ascertained (box 72). If there is movement data, then the position of a cursor on a display screen is updated based upon the movement data (box 74). Next, the presence of any key actuation data is ascertained (box 76). If there is key actuation data, the compound key to which the actuated key is assigned is determined (box 78) and the pointing device button operation associated with that compound key is executed (box 80). The state of keyboard is then checked to determine if it has changed (box 70). If the keyboard is in the second state, corresponding to the keyboard acting as a normal keyboard, the presence of any key actuation data is ascertained (box 82). If there is key actuation data, the keys actuated are interpreted as letters, numbers, and commands as is typically done for standard keyboards (box 84). The state of the keyboard is then checked to determine if it has changed (box 70).

It will be appreciated by those skilled in the art having the benefit of this disclosure that this invention provides a keyboard that may be utilized as a computer pointing device for disabled users. Further modifications and alternative embodiments of various aspects of the invention will be apparent to those skilled in the art in view of this description. For example, two movement sensors could be coupled to sides of the keyboard where a first sensor detects movement in one direction and a second sensor detects movement in another direction. Additionally, the keyboard may be mounted to a fixed frame, support, or stand and operation of a button on the keyboard allows and prevents movement of the keyboard relative to the frame, support, or stand. It is intended that the following claims are interpreted to embrace all such modifications and changes and, accordingly, the specification and drawings are to be regarded in an illustrative rather than a restrictive sense.

What is claimed is:

1. An apparatus, comprising:
   a keyboard, wherein the keyboard comprises a plurality of keys, and wherein the plurality of keys comprises a separate key for each alphabet letter;
   a movement sensor coupled to the keyboard;
   a button located on the keyboard and adapted for either allowing or preventing movement of the keyboard; and
   a user programmable means for grouping the plurality of keys into one or more compound keys that enable the keyboard to function as a pointing device when movement of the keyboard is allowed.

2. The apparatus of claim 1, wherein the movement sensor comprises:
   a means for coming into contact with a surface below the keyboard; and
   a movement transducer coupled to the means for coming into contact with the surface, wherein the movement transducer is located within a lower portion of the keyboard.

3. The apparatus of claim 2, further comprising:
   a first set of legs attached to a lower surface of the keyboard, wherein the first set of legs is adapted to allow the keyboard to move freely about the surface upon which the keyboard is placed; and
   a second set of legs attached to a lower surface of the keyboard, wherein the second set of legs is adapted to prevent movement of the keyboard about the surface.

4. The apparatus of claim 3, wherein the operation of the button positions either the first set of legs and the means for coming into contact with the surface or the second set of legs in contact with the surface.

5. A system, comprising:
   a computer system;
   a keyboard coupled to the computer system, wherein the keyboard comprises a plurality of keys, and wherein the plurality of keys comprises a separate key for each alphabet letter;
   a movement sensor coupled to the keyboard;
   a button located on the keyboard, wherein the button has a first state that allows movement of the keyboard, and wherein the button has a second state that prevents movement of the keyboard; and
   a program, adapted for execution on the computer system, to:
   process movement data from the movement sensor when the button is in the first state;
   group the plurality of keys into a specific command that corresponds to a pointing device button operation when the button is in the first state, wherein the keys that are grouped into the specific command are adjustable by a user of the system; and
   process normal key actuation data from the keyboard when the button is in the second state.

6. The system of claim 5, wherein the movement sensor comprises:
   a means for coming into contact with a surface extending below the keyboard; and
   a movement transducer coupled to the means for coming into contact with the surface, wherein the movement transducer is located within a lower portion of the keyboard.

7. The system of claim 6, further comprising:
   a first set of legs attached to a lower surface of the keyboard, wherein the first set of legs is adapted to allow the keyboard to move freely about the surface upon which the keyboard is placed; and
   a second set of legs attached to a lower surface of the keyboard, wherein the second set of legs is adapted to prevent movement of the keyboard about the desktop.

8. The system of claim 7, wherein the first set of legs and the means for coming into contact with the surface is in contact with the surface when the button is in the first state, and wherein the second set of legs is in contact with the surface when the button is in the second state.

9. The system of claim 5, wherein the program comprises a device driver.

10. The system of claim 5, further comprising a display screen coupled to the computer system, wherein the program is adapted to control a position of a cursor on the display screen depending on the movement data when the button is in the first state.

11. The system of claim 5, wherein the keys on the keyboard are grouped to form two specific commands corresponding to operation of a left-hand button on a pointing device and operation of a right-hand button on the pointing device.

12. The system of claim 5, wherein the program comprises de-bounce logic to disregard any successive key actuation that occurs within an adjustable time interval after an initial key actuation.

13. A computer-readable storage medium, comprising:
a first instruction that is adapted to process movement data from movement of a QWERTY keyboard containing a movement sensor; and
a second instruction that is adapted to process key actuation data from the keyboard, wherein the second instruction groups one or more keys into a specific command comprising a pointing device button operation, and wherein the second instruction can be modified by a user to adjust which keys are grouped into the specific command.

14. The storage medium of claim 13, wherein the storage medium comprises a hard disk, a floppy disk, a read-only memory, and/or a random-access memory.

15. The storage medium of claim 13, wherein the first instruction is further adapted to control a position of a cursor on a display screen depending on the movement data.

16. The storage medium of claim 13, wherein the pointing device button operation effectuates a left-hand pointing device button or a right-hand pointing device button.

17. The storage medium of claim 13, wherein the first instruction and the second instruction are operable when the keyboard is in a first state.

18. The storage medium of claim 17, further comprising a third instruction that is adapted to process key actuation data from the keyboard in a normal fashion when the keyboard is in a second state.

19. The storage medium of claim 18, further comprising a fourth instruction that is adapted to determine the state of the keyboard depending on actuation of a button located on the keyboard.

20. An apparatus, comprising:
a keyboard, wherein the keyboard comprises a plurality of keys, and wherein the plurality of keys comprises a separate key for each alphabet letter;
a first means for stationarily positioning the keyboard relative to a surface;
a second means for enabling movement of the keyboard relative to the surface;
a third means for generating pointing device signals corresponding to the movement of the keyboard;
a fourth means for grouping the plurality of keys into one or more specific pointing device button operations, wherein the grouping of the plurality of keys is changeable by a user of the apparatus; and
means for selecting between the first and second means.

21. The apparatus of claim 20, further comprising sensing means for detecting movement of the keyboard relative to the surface.

22. The apparatus of claim 21, wherein the apparatus functions as a keyboard when the first means are selected and as a pointing device when the second means are selected.

23. An apparatus, comprising:
a keyboard, wherein the keyboard comprises a plurality of keys, and wherein the plurality of keys comprises a separate key for each alphabet letter;
means adapted for selecting between allowing or preventing movement of the keyboard relative to a surface;
means for enabling the keyboard to function as a pointing device if movement of the keyboard is selected; and
means for grouping one or more of the plurality of keys into a specific command, wherein the specific command comprises a specific pointing device button operation, and wherein the grouping of the one or more plurality of keys is changeable by a user of the apparatus.

24. A method for use in a data processing system having a processor, memory, keyboard, and display, comprising:
receiving keyboard input for display when the keyboard is in a first mode, wherein the keyboard comprises a plurality of keys, and wherein the plurality of keys comprises a separate key for each alphabet letter;
sensing movement of the keyboard when the keyboard is in a second mode;
effectuating movement of a pointer on the display in response to the sensed movement of the keyboard; and
selecting a location of the pointer on the display, wherein selecting comprises receiving an actuation of one or more of the plurality of keys, wherein the one or more keys are adapted to provide a specific pointing device command, and wherein the one or more keys are programmed by a user to provide the specific pointing device command.

25. The apparatus as recited in claim 1, wherein the keyboard comprises a first grouping of keys and a second grouping of keys, and wherein actuation of any one of the first grouping of keys effectuates a left-hand pointing device, and wherein actuation of any one of the second grouping of keys effectuates a right-hand pointing device.

26. The apparatus as recited in claim 1, wherein the button is adapted during use to indicate a cursor positioned on a display screen or a key actuation data at the cursor position.

27. The system as recited in claim 5, wherein the program is adapted to indicate a cursor positioned on a display screen during the first state and process the key actuation data at the cursor position during the second state.

* * * * *

UNITED STATES PATENT AND TRADEMARK OFFICE
CERTIFICATE OF CORRECTION

PATENT NO. : 6,603,461 B2
DATED : August 5, 2003
INVENTOR(S) : Smith, Jr. et al.

It is certified that error appears in the above-identified patent and that said Letters Patent is hereby corrected as shown below:

<u>Column 10,</u>
Lines 46-51, Claim 25, should be corrected as follows:
The apparatus as recited in claim 1, wherein actuation of one of the compound keys effectuates a left-hand pointing device, and wherein actuation of another one of the compound keys effectuates a right-hand pointing device.

Signed and Sealed this

Thirtieth Day of March, 2004

JON W. DUDAS
*Acting Director of the United States Patent and Trademark Office*